United States Patent
Lawrence et al.

(10) Patent No.: US 10,895,338 B2
(45) Date of Patent: Jan. 19, 2021

(54) ENHANCED END DESIGN FOR TUBULAR PRESS CONNECTIONS

(71) Applicant: NIBCO INC., Elkhart, IN (US)

(72) Inventors: Benjamin L. Lawrence, Elkjart, IN (US); Richard D. Latham, Granger, IN (US); David A. Bobo, Granger, IN (US); Christopher W. Mason, Granger, IN (US); Ronald Dale Paige, Granger, IN (US)

(73) Assignee: NIBCO INC., Elkhart, IN (US)

( * ) Notice: Subject to any disclaimer, the term of this patent is extended or adjusted under 35 U.S.C. 154(b) by 387 days.

(21) Appl. No.: 15/961,223

(22) Filed: Apr. 24, 2018

(65) Prior Publication Data

US 2018/0313480 A1 Nov. 1, 2018

Related U.S. Application Data

(60) Provisional application No. 62/516,772, filed on Jun. 8, 2017, provisional application No. 62/491,842, filed on Apr. 28, 2017.

(51) Int. Cl.
*F16L 9/02* (2006.01)
*F16L 21/08* (2006.01)
*F16L 21/03* (2006.01)
*F16L 13/14* (2006.01)

(52) U.S. Cl.
CPC .............. *F16L 21/08* (2013.01); *F16L 13/142* (2013.01); *F16L 21/03* (2013.01); *F16L 9/02* (2013.01)

(58) Field of Classification Search
CPC ................................ F16L 21/03; F16L 13/142

USPC ......................................................... 285/382
See application file for complete search history.

(56) References Cited

U.S. PATENT DOCUMENTS

| | | | |
|---|---|---|---|
| 2,147,356 A | 2/1939 | Scholtes | |
| 3,477,750 A | 11/1969 | Powell | |
| 4,064,614 A * | 12/1977 | Horvath | B21C 37/28 29/890.144 |
| 4,328,982 A | 5/1982 | Christianson | |
| 5,080,406 A | 1/1992 | Hyatt et al. | |
| 6,450,553 B1 | 9/2002 | Suresh | |
| 6,619,701 B1 | 9/2003 | Udhofer | |
| 7,954,861 B2 | 6/2011 | Swift et al. | |
| 9,145,992 B2 | 9/2015 | Arment et al. | |
| 9,638,361 B2 | 5/2017 | Arment et al. | |

(Continued)

FOREIGN PATENT DOCUMENTS

| | | |
|---|---|---|
| CA | 2965907 A1 | 5/2016 |
| DE | 102005043238 A1 | 3/2007 |

(Continued)

OTHER PUBLICATIONS

Canadian Search Report for Canadian Application No. 3,003,001 dated May 5, 2020.

*Primary Examiner* — David Bochna
*Assistant Examiner* — James A Linford
(74) *Attorney, Agent, or Firm* — Price Heneveld LLP

(57) ABSTRACT

A connection socket for a tubular press connection including a socket cup having a metal alloy composition and comprising: an O-ring portion defining an O-ring recess; a plurality of gripper arrays positioned equidistant along an internal surface of the socket cup; and a plurality of raised ridges positioned equidistant on an exterior surface of the socket cup. The raised ridges may extend over the gripper arrays.

20 Claims, 5 Drawing Sheets

(56) References Cited

U.S. PATENT DOCUMENTS

2011/0204624 A1    8/2011  Lawrence
2014/0197633 A1    7/2014  Nixon et al.
2017/0234464 A1    8/2017  Lawrence et al.

FOREIGN PATENT DOCUMENTS

EP           0343395      *  4/1989
EP           0343395  A2    11/1989
WO    WO-2013101878 A1  *  7/2013  .............. F16L 17/02

* cited by examiner

ENHANCED END DESIGN FOR TUBULAR PRESS CONNECTIONS

CROSS-REFERENCE TO RELATED APPLICATIONS

This patent application claims priority under 35 U.S.C. § 119(e) to U.S. Provisional Patent Application No. 62/491,842, entitled "ENHANCED END DESIGN FOR TUBULAR PRESS CONNECTIONS," filed Apr. 28, 2017, and U.S. Provisional Patent Application No. 62/516,772, entitled "ENHANCED END DESIGN FOR TUBULAR PRESS CONNECTIONS," filed Jul. 8, 2017, the entire disclosures of which are incorporated herein by reference.

FIELD

The present disclosure generally relates to connection sockets for tubular press connections, and more particularly, for piping components made from a wide range of alloys including ferrous alloys, copper-based alloys and nickel-based alloys.

BACKGROUND

NIBCO® Press System® components largely include a cylindrical socket that is inserted over and then crimped onto a pipe end. In this configuration, a pressing jaw, powered by a pressing tool, can be driven into the cylindrical socket to form a press connection. The outer joinery socket of the pressing jaw grips and deforms the cylindrical socket over the pipe end. The design of the pressing jaw typically includes a two-piece 'clam shell' die with a hexagonal or circular-shaped joinery socket. For both jaw designs, an O-ring positioned on an inner surface of the socket is also compressed to seal off the joint by the pressing jaw.

A hexagonal jaw pattern is typically used in a pressing jaw configured for copper tube joinery. Since copper tubing is relatively thin-walled and soft, a press connection for copper tubing can be characterized by six indentations of the tube on both inboard and outboard sides of an O-ring. These points can affix the socket to the tube, by action of the pressing jaw, with or without the aid of machined gripping features (e.g., such as barbs), gripper rings and/or gripper sleeves.

The cylindrical jaw pattern is typically used in a pressing jaw configured to mechanically join together carbon steel or stainless steel to black iron pipe (e.g., a cast form of steel pipe that is widely used for gas service because of its high durability and relatively low cost). Since black iron piping presents a harder and stronger piping (e.g., as compared to copper tubing), the hexagonal jaw approach is less favorable due to high demand for tool power to achieve a six-point deformation of the pipe. As such, the cylindrical 'clam-shell' jaw is utilized in a pressing jaw to press a carbon or stainless steel socket over a black iron pipe, and the socket often will have some additional means (e.g., barbs, gripper rings and/or gripper sleeves) of concentrating stress from the pressing jaw in deforming the socket over the pipe.

While these socket designs can be effective at creating seals with hexagonal and circular-shaped pressing jaws, the dimensional tolerances between the pipe and the socket must be carefully controlled to avoid point contacts during the pressing action by the jaw. Even with carefully controlled dimensional tolerances between the pipe and socket, point contacts are prevalent from the nature of the hexagonal or circular-shaped joinery sockets pressing against the socket to form the seal with the pipe. A consequence of point contacts in the press connection is asymmetric regions of the seal between the socket and the pipe with relatively strong and relatively weak regions of the seal formed by the socket. Similarly, the point contacts can lead to an asymmetry in the regions of the seal between the O-ring and the pipe, leading to strong and relatively weak regions of the seal formed by the O-ring. Consequently, the strength of the seal can be reduced by these point contacts as the integrity of the seal depends strongly on its weakest portion(s).

Accordingly, there is a need for strong and economical connection sockets for tubular press connections, and more particularly, for piping components made from a wide range of alloys including ferrous alloys, copper-based alloys and nickel-based alloys

SUMMARY OF THE DISCLOSURE

According to an aspect of the present disclosure, a connection socket for a tubular press connection is provided. The socket includes a socket cup having a metal alloy composition. The socket cup includes an O-ring portion defining an O-ring recess, a plurality of gripper arrays positioned equidistant along an internal surface of the socket cup, and a plurality of raised ridges positioned equidistant on an exterior surface of the socket cup.

According to another aspect of the present disclosure, a connection socket for a tubular press connection is provided. The socket includes a socket cup having a metal alloy composition. The socket cup includes an O-ring portion defining an O-ring recess, and a plurality of gripper arrays positioned equidistant along an internal surface of the socket cup, or a plurality of raised ridges positioned equidistant on an exterior surface of the socket cup.

According to a further aspect of the present disclosure, a tubular press connection is provided that includes a socket cup having a metal alloy composition. The socket cup includes an O-ring portion defining an O-ring recess, a plurality of gripper arrays positioned equidistant along an internal surface of the socket cup, and a plurality of raised ridges positioned equidistant on an exterior surface of the socket cup. The press connection also includes an O-ring positioned in the O-ring recess; and a tube having a metal alloy composition and comprising a pipe end in contact with the plurality of gripper arrays and the O-ring, the plurality of gripper arrays, O-ring and the pipe end defining a seal.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
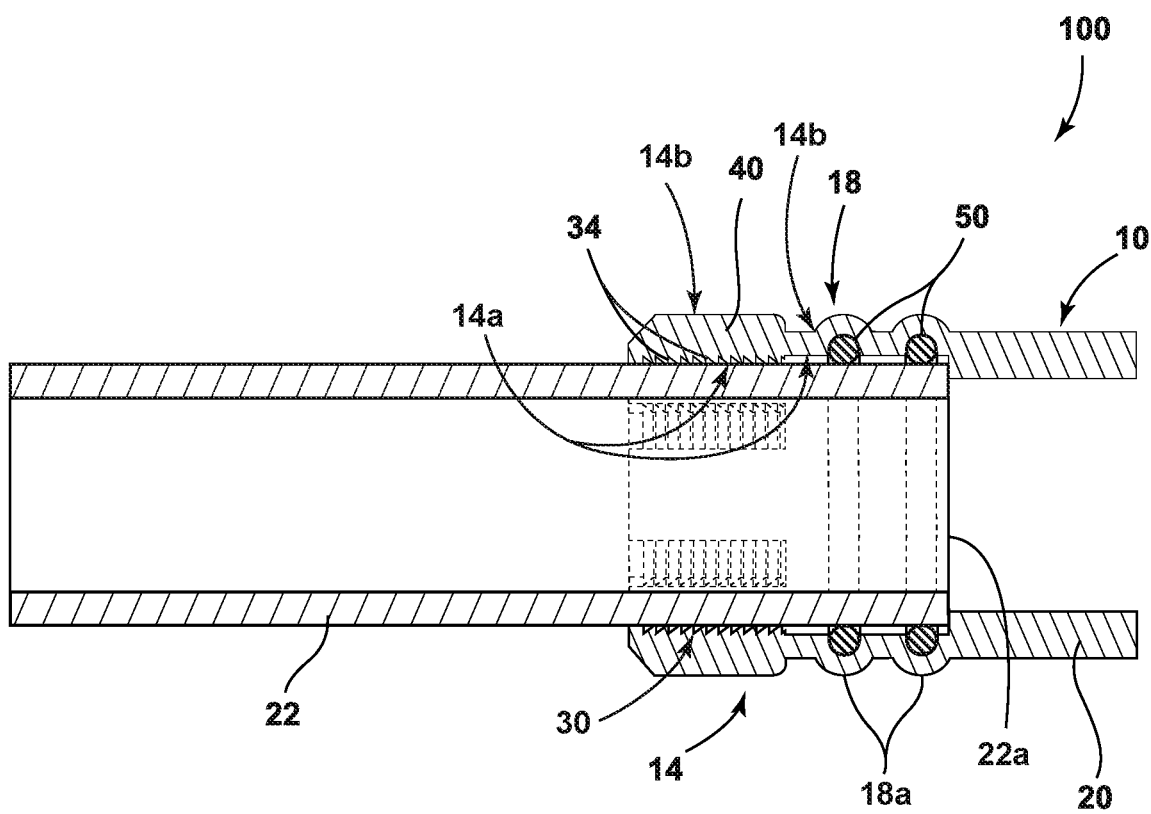
FIG. 1 is a cross-sectional view of a tubular press connection, according to an embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the disclosure, and depicted in exemplary form in FIGS. 1-5, the connection socket configurations for tubular press connections, and tubular press connection configurations, provide improvements in the sealing capability, mechanical performance, and manufacturing of mechanical press connections for metal alloy tubing and piping, such as employed in NIBCO® Press System® components. These configurations include design features that more evenly distribute and control the applied force delivered to the connection socket by a standard pressing jaw and pressing tool. The design of the connection socket can incorporate a series of circumferentially equidistant gripper arrays on its inner surface and/or circumferentially equidistant raised ridges on its outer circumference, including both pipe grip and O-ring compression areas.

Referring to FIG. 1, a tubular press connection 100 is depicted that includes a connection socket 10. The connection socket 10 includes a socket cup 14, in some embodiments, fabricated from a metal alloy composition. The socket cup 14 can include an O-ring portion 18 that defines an O-ring recess 18a; a plurality of gripper arrays 30 positioned equidistant along an internal surface 14a of the socket cup 14; and a plurality of raised ridges 40 positioned equidistant on an exterior surface 14b of the socket cup 14 (see also FIG. 2). As also shown in FIG. 1, the tubular press connection 100 includes one or more O-rings 50 positioned in the O-ring recess 18a; and a pipe 22 (e.g., a tube, a pipe or other cylindrical conveyance structure) having a metal alloy composition. Preferably, the O-rings 50 are fabricated from a polymeric material, preferably an elastomeric material, suitable for use in the application as understood by those with ordinary skill in the field of the disclosure. Further, the pipe 22 includes a pipe end 22a in contact with the plurality of gripper arrays 30 and the one or more O-rings 50. Further, the gripper arrays 30, the one or more O-rings 50 and the pipe end 22a define a seal between the pipe 22 and the socket cup 14.

Figure 2:
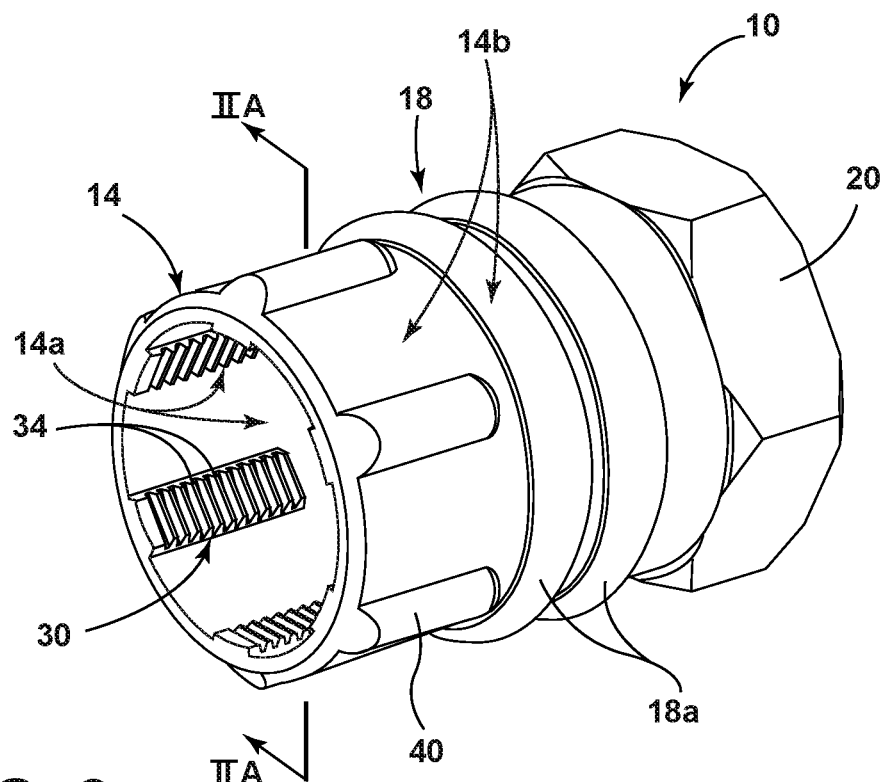
FIG. 2 is a perspective view of a connection socket with a plurality of raised ridges and a plurality of gripper arrays, each gripper array defining a plurality of rows of teeth, according to an embodiment.
Figure 2A:
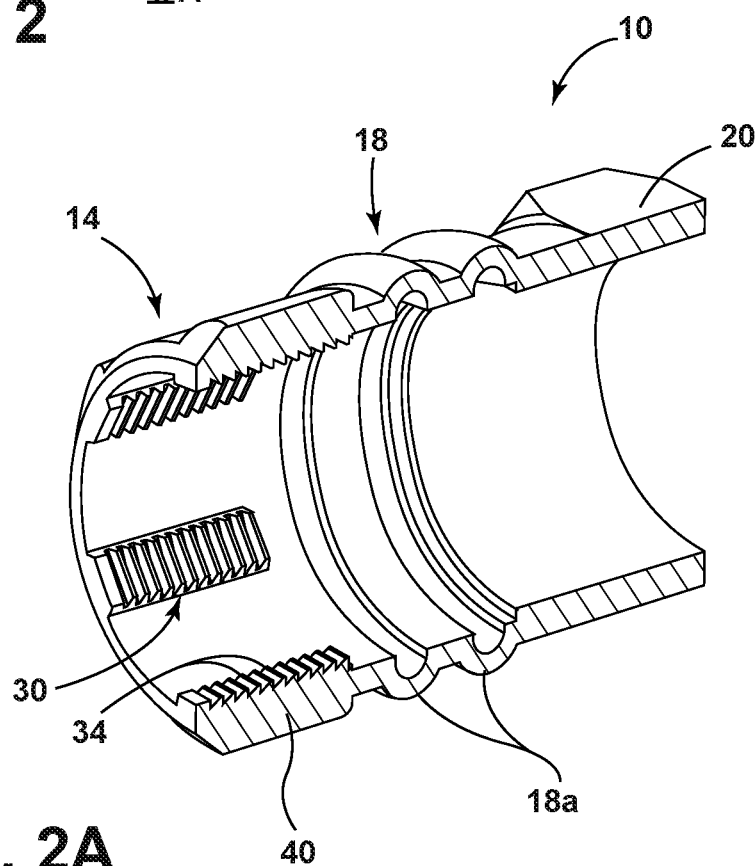
FIG. 2A is a cross-sectional view at line IIA-IIA of the connection socket depicted in FIG. 2.

As noted earlier, reference numerals 100 and 10 are generally directed to a tubular press connection and connection socket, respectively, as shown in FIGS. 1, 2 and 2A. The connection socket 10, as employed by the tubular press connection 100, may be configured to facilitate the joining of one or more pipes 22 to enable the transfer of a fluid (e.g., gas and/or liquids) between the pipes 22 without leakage. In other words, the tubular press connection 100 may be a press connection for piping configured to convey a gaseous medium. Further, the connection socket 10 may be sealed and used to terminate or otherwise cap a pipe 22. Still further, those with ordinary skill in the art can appreciate that the connection socket 10 may be configured as a valve with the features outlined earlier with regard to the socket 10 (e.g., with an O-ring recess 18a, O-rings 50, etc.).

Referring again to FIGS. 1, 2 and 2A, the O-ring portion 18 may define one or more O-ring recesses 18a. According to various examples, the O-ring portion 18 defines two O-ring recesses 18a. The O-ring recesses 18a are configured to hold, or seat, one or more O-rings 50. Use of the O-ring recesses 18a allows for the connection socket 10 to resist migration of the O-rings 50 during and after the connection socket 10 is joined to a pipe 22.

The connection socket 10 may be configured to accept the insertion of the pipe 22 into the socket cup 14. As shown in FIGS. 1, 2 and 2A, the socket cup 14 can define a plurality of gripper arrays 30. The gripper arrays 30 are defined on an interior surface of the socket cup 14. The gripper arrays 30 may be integrally formed or otherwise defined by the socket cup 14. It will be understood that the gripper arrays 30 may be a coupled or joined to the socket cup 14 after manufacturing of the connection socket 10 without departing from the teachings provided herein.

According to some embodiments depicted in FIGS. 1, 2 and 2A, each of the gripper arrays 30 provides one or more independent rows of teeth 34. Each of the gripper arrays 30 may define the same number of rows of teeth 34, or each gripper array 30 may define a different number of rows of teeth 34. It should also be understood that embodiments of the connection socket 10 and tubular press connection 100 can also employ gripper arrays 30 with shapes other than 'teeth', such as rounded edges (see FIG. 3), facets, rough edges, etc., to grip a pipe 22.

In the depicted example shown in FIGS. 1, 2 and 2A, the socket cup 14 defines six gripper arrays 30, but it will be understood that the socket cup 14 may define more or less than six gripper arrays 30. For example, the socket cup 14 may define one, two, three, four, five, six, seven, eight, or greater than eight gripper arrays 30. According to some implementations, the socket cup 14 can include 4 to 12 gripper arrays 30.

The gripper arrays 30 may be located at a variety of locations around the socket cup 14, particularly on its inner surfaces. According to various preferred examples, the gripper arrays 30 may be spaced equidistantly along an internal surface 14a of the socket cup 14. In other implementations, sets of the gripper arrays 30 may be clustered or otherwise dispersed around the socket cup 14, whereas each of the sets is positioned equidistantly along an internal surface 14a of the socket cup 14.

Referring again to FIGS. 1, 2 and 2A, implementations of the connection socket 10 and tubular press connection 100 employing a socket cup 14 with a plurality of gripper arrays 30, with or without rows of teeth 34, are configured to grip the pipe 22 inserted in the socket cup 14. As such, examples where the gripper arrays 30 are equidistantly spaced around the circumference of the socket cup 14 can advantageously provide for even distribution of the biting force applied by a pressing jaw and pressing tool (not shown). Further, the set-off or height of the gripper arrays 30 relative to the inner surface of the socket cup can allow for looser dimensional tolerances between the diameter of the pipe 22 and the inner surface of socket cup 14, which can reduce manufacturing costs for the socket 10 and/or the tubular press connection 100.

As also shown in FIGS. 1, 2 and 2A, the connection socket 10 and the tubular press connection 100 can be configured such that an outer surface of the socket cup 14 defines a plurality of raised ridges 40. According to various examples, the socket cup 14 defines a plurality of raised ridges 40. The raised ridges 40 on the outer surface of the socket cup 14 are in line with, or positioned proximate to, the plurality of gripper arrays 30 located on the inner surface of the socket cup 14. The raised ridges 40 may extend over a portion, a majority or an entirety of a length of the gripper arrays 30. In other examples (see FIG. 5), the raised ridges (e.g., raised ridges 40d) may extend past the gripper arrays 30 and in contact with the O-ring portion 18 over the O-ring recesses 18a.

According to some embodiments depicted in FIGS. 1, 2 and 2A, each of the raised ridges 40 has at least one outermost surface for direct contact with a pressing jaw applied by a pressing tool (not shown). As shown in these figures, the plurality of raised ridges 40 can be configured such that each ridge 40 defines a rounded outer surface for direct contact with a pressing jaw driven by a pressing tool. In other implementations, the connection socket 10 and tubular press connection 100 can also employ a plurality of raised ridges 40 with shapes other than rounded outer surfaces, such as facets, rough edges, etc., to facilitate contact and grip by a pressing jaw.

In the depicted example shown in FIGS. 1, 2 and 2A, the socket cup 14 defines six raised ridges 40, but it will be understood that the socket cup 14 may define more or less than six raised ridges 40. For example, the socket cup 14 may define one, two, three, four, five, six, seven, eight, or greater than eight raised ridges 40. According to some implementations, the socket cup 14 can include 4 to 12 raised ridges 40.

The raised ridges 40 may be located at a variety of locations around the socket cup 14, particularly on its outer surfaces. According to various preferred examples, the plurality of raised ridges 40 may be spaced equidistantly along the outer surface of the socket cup 14. In other implementations, sets of the raised ridges 40 may be clustered or otherwise dispersed around the socket cup 14, whereas each of the sets is positioned equidistantly along an outer surface of the socket cup 14.

Referring again to FIGS. 1, 2 and 2A, implementations of the connection socket 10 and tubular press connection 100 employing a socket cup 14 with a plurality of raised ridges 40 are configured to facilitate the gripping of the raised ridges 40 by a pressing jaw to press fit a socket cup 14 over an end 22a of a pipe 22 that is inserted in the socket cup 14. As such, examples where the raised ridges 40 are equidistantly spaced around the circumference of the socket cup 14 can advantageously provide for even distribution of the biting force applied by a pressing jaw and pressing tool (not shown). Further, the set-off or height of the raised ridges 40 relative to the outer surface of the socket cup 14 can allow for looser control over dimensional tolerances and fit between the inner surfaces of the pressing jaw and the raised ridges 40. As a result, the socket cup 14 with a plurality of raised ridges 40, as employed by the connection sockets 10, can reduce installation costs associated with forming a tubular press connection 100 with these sockets 10.

Figure 3:
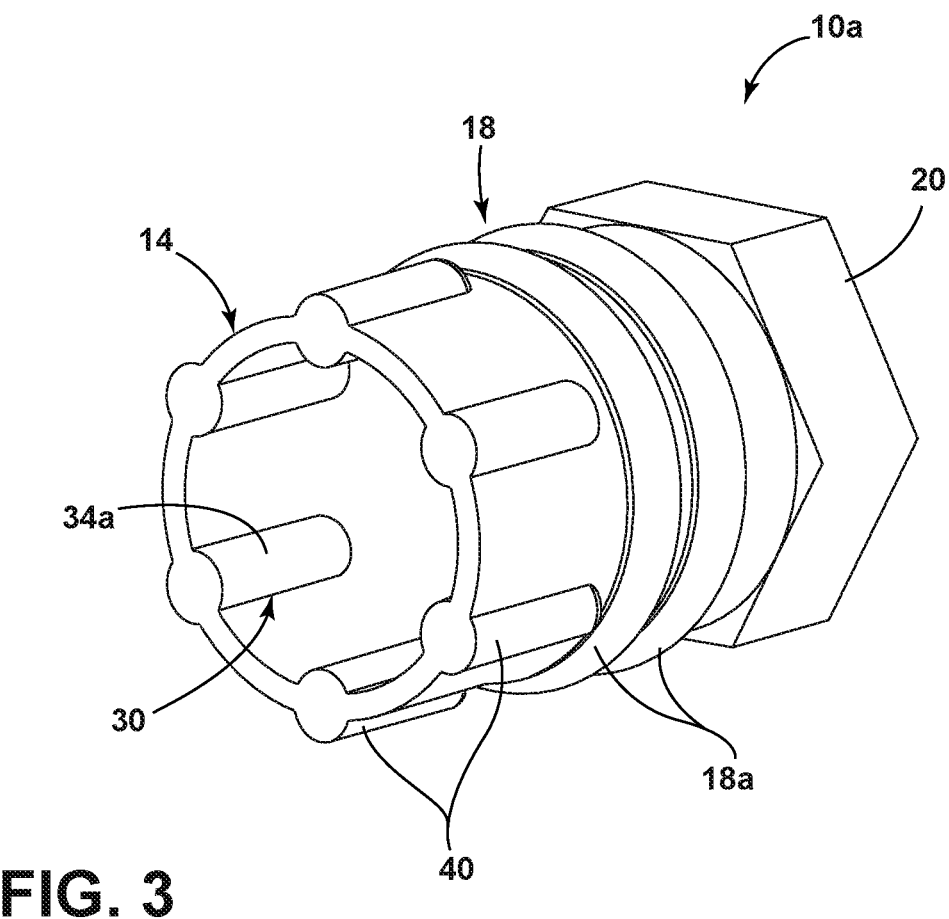
FIG. 3 is a perspective view of a connection socket with a plurality of raised ridges and a plurality of gripper arrays, according to an embodiment.

Referring now to FIG. 3, a connection socket 10a with a plurality of raised ridges 40 and a plurality of gripper arrays 30 is depicted that can be employed in a tubular press connection 100 (see FIG. 1), according to an embodiment. Connection socket 10a shown in FIG. 3 is similar to connection socket 10 (see FIGS. 1, 2 and 2A), and like-numbered elements have the same or substantially similar functions and structures. The primary difference between the sockets is that socket 10a employs a plurality of gripper arrays 30 in the form of rounded bumps 34a (see FIG. 3), as opposed to the rows of teeth 34 employed by the socket 10 (see FIGS. 2, 2A). While the gripper arrays 30 in the form of rounded bumps 34a employed by the socket 10a have a bit less ability to deform and press into a pipe end 22a as compared to the rows of teeth 34 of the socket 10, they are advantageously simple in design and significantly less costly to manufacture. In some embodiments, for example, connection socket 10a can be formed as-is (e.g., from a die) without substantial machining after formation of the part.

Figure 4A:
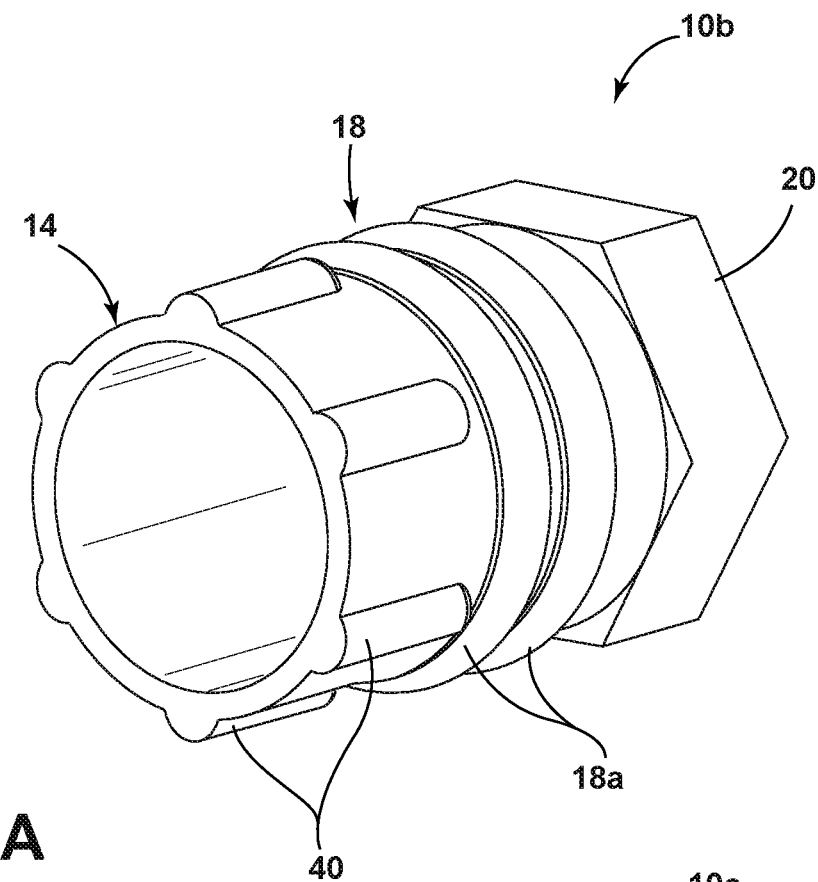
FIG. 4A is a perspective view of a connection socket with a plurality of raised ridges, according to an embodiment.

Referring now to FIG. 4A, a connection socket 10b with a plurality of raised ridges 40 is depicted that can be employed in a tubular press connection 100 (see FIG. 1), according to an embodiment. Connection socket 10b shown in FIG. 4A is similar to connection socket 10 (see FIGS. 1, 2 and 2A), and like-numbered elements have the same or substantially similar functions and structures. The primary difference between the sockets is that socket 10b does not employ a plurality of gripper arrays 30 (see FIG. 4A). While the plurality of gripper arrays 30 in the form of rows of teeth 34 of the socket 10 (see FIGS. 1, 2 and 2A) offers a bit more ability to deform and press a pipe end 22a as compared to the socket 10b of FIG. 4A that lacks gripper arrays 30, it can be more expensive to manufacture in view of the presence of its gripper arrays 30 than the socket 10b.

Figure 4B:
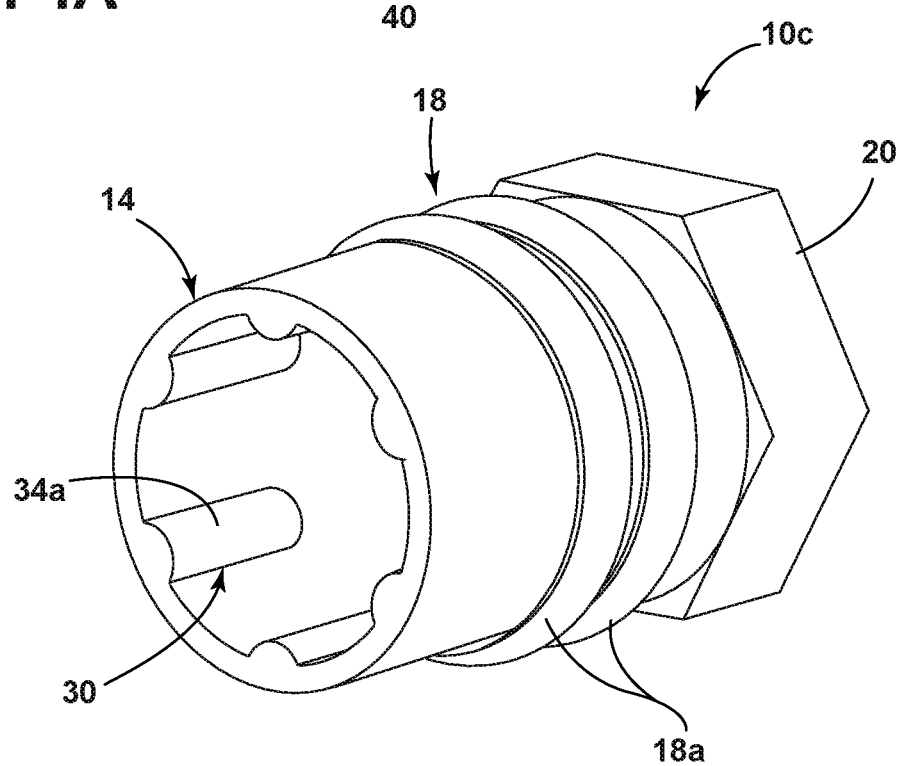
FIG. 4B is a perspective view of a connection socket with a plurality of gripper arrays, according to an embodiment.

Referring now to FIG. 4B, a connection socket 10c with a plurality of gripper arrays 30 in the form of rounded bumps 34a is depicted that can be employed in a tubular press connection 100 (see FIG. 1), according to an embodiment. Connection socket 10c shown in FIG. 4B is similar to connection socket 10 (see FIGS. 1, 2 and 2A), and like-numbered elements have the same or substantially similar functions and structures. The primary difference between the sockets is that socket 10c does not employ a plurality of raised ridges 40 (see FIG. 4A). The plurality of raised ridges 40 of the socket 10 (see FIGS. 1, 2 and 2A) offers a bit more ability to spread and distribute forces applied from a pressing jaw to the socket cup 14 and the pipe end 22a (see FIGS. 1, 2, and 2A) as compared to the socket 10c, which lacks a plurality of raised ridges 40. On the other hand, the connection socket 10c is advantageous in that it can perform the same function as the connection socket 10, but is less expensive to manufacture in view of its lack of raised ridges 40.

Figure 5:
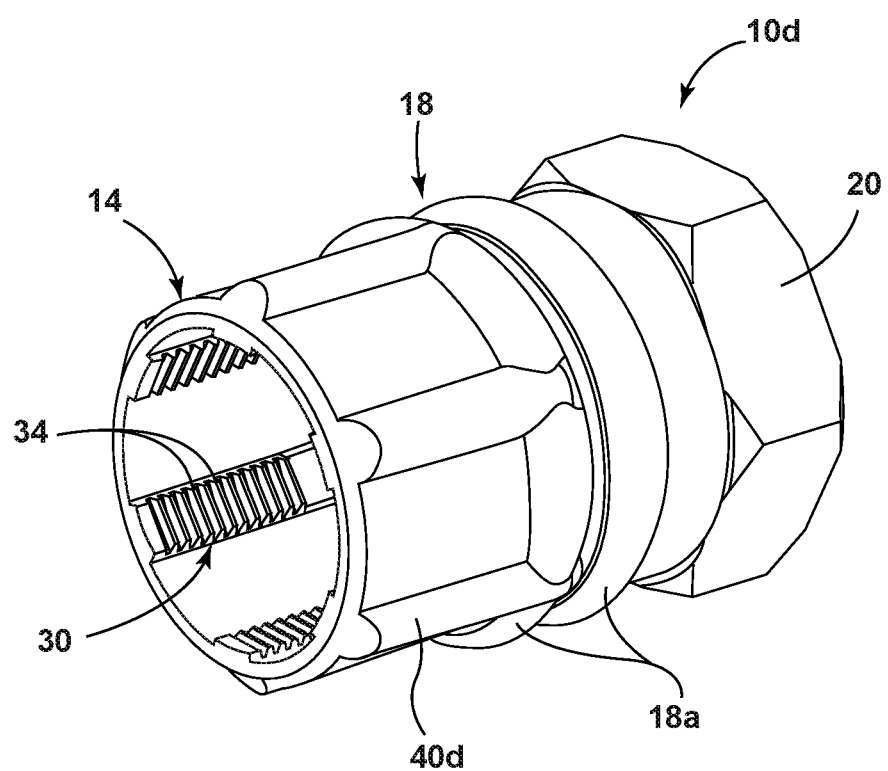
FIG. 5 is a perspective view of a connection socket with a plurality of raised ridges in contact with an O-ring portion and a plurality of gripper arrays, according to an embodiment.

Referring now to FIG. 5, a connection socket 10d with a plurality of raised ridges 40d and a plurality of gripper arrays 30 with rows of teeth 34 is depicted that can be employed in a tubular press connection 100 (see FIG. 1), according to an embodiment. Connection socket 10d shown in FIG. 5 is similar to connection socket 10 (see FIGS. 1, 2 and 2A), and like-numbered elements have the same or substantially similar functions and structures. The primary difference between the sockets is that socket 10d employs a plurality of raised ridges 40d that extend over the gripper arrays 30 and contact the O-ring portion 18. More particularly, the extension of the raised ridges 40d to the O-ring portion 18 ensures that forces from a pressing jaw (not shown) are distributed evenly around the O-ring recess 18a and the O-rings 50 (see FIG. 1), thus preventing kinking and minimizing asymmetries in the seal form by the connection socket 10d.

The connection sockets 10-10d, as depicted in exemplary form in FIGS. 1-5, achieve one or more functions that can be realized independently or together in the formation of a tubular press connection, such as tubular press connection 100 (see FIG. 1). One function involves improving the grip between the connection sockets 10-10d and the pipe 22. This improvement can be achieved by providing a plurality of the gripper arrays 30 on an inner or internal surface 14a of the socket cup 14 (e.g., as in connection sockets 10, 10a, 10c and 10d). As explained above, the gripper arrays 30 provide a biting force from the connection sockets 10-10d to the pipe 22. In a joining operation between the connection sockets 10-10d and the pipe 22, the pipe end 22a of the pipe 22 is slid into the socket cup 14. Next, pressing jaws and/or a clamp (not shown) apply force to the plurality of raised ridges 40 (e.g., as in connection sockets 10, 10a, 10b, and 10d) or directly to the outer surface of the socket cup 14 (e.g., in connection socket 10c), which transfers and distributes the force into the gripper arrays 30 (e.g., as in connection sockets 10, 10a, 10c and 10d) or the inner surface of the socket cup 14 (e.g., as in connection socket 10b) to clamp the socket cup 14 over the pipe end 22a, thus forming a seal.

In connection sockets with a plurality of gripper arrays 30 (e.g., as in connection sockets 10, 10a, 10c and 10d), the arrays 30 advantageously can be machined or otherwise formed with rows of teeth 34 (see, e.g., FIG. 2) or other protrusions that can be tailored in terms of shape and/or size for pipes 22 fabricated from alloys and materials with particular material properties (e.g., elastic modulus). Further, the size of the socket cup 14 employed in connection sockets 10-10d can be easily made so as to accommodate both metric and English pipe dimensions of pipes 22. Even further, connection sockets 10, 10a, 10d (see FIGS. 1, 2, 2A, 3 and 5) with coinciding pluralities of gripper arrays 30 and raised ridges 40 can be configured to allow the overall gripping force of the connection socket 10 to be increased (e.g., by adding additional gripper arrays 30) to keep up with increasing pipe diameters.

Another beneficial function of the connection sockets 10-10d (see FIGS. 1-5) relates to the improved compression of the O-rings 50 afforded by these designs. As noted earlier, it has been observed that conventional press fittings formed with pressing jaws are susceptible to an uneven compression and distribution of the material of the O-rings 50 throughout the O-ring recess or recesses 18a. By utilizing connection sockets with a plurality of raised ridges 40 on an outer surface of the socket cup 14 (e.g., connection sockets 10, 10a, 10b, and 10d), an even distribution of force may be applied to the plurality of gripper arrays 30 (if present) and/or the inner surface of the socket cup 14 to form a seal to the pipe end 22a (see FIG. 1). Further, an even more uniform distribution of force may be applied to the O-rings 50 in examples where the raised ridges 40 extend in contact with the O-ring portion 18 over the O-ring recess 18a.

Referring again to the connection sockets 10-10d and the tubular press connection 100, as depicted in exemplary form in FIGS. 1-5, the metal alloy compositions associated with the features (e.g., the socket cup 14, the plurality of gripper arrays 30, the plurality of raised ridges 40, pipe 22, etc.) of these elements can be fabricated from a wide range of alloys, unless otherwise noted. In some embodiments, these features can be made from a metal alloy of a group consisting of ferrous alloys, copper-based alloys and/or nickel-based alloys.

According to a first aspect, a connection socket for a tubular press connection comprises a socket cup having a metal alloy composition. The socket cup comprises an O-ring portion defining an O-ring recess, a plurality of gripper arrays positioned equidistant along an internal surface of the socket cup, and a plurality of raised ridges positioned equidistant on an exterior surface of the socket cup.

According to a second aspect, the connection socket of the first aspect is provided, wherein each of the raised ridges extends over the gripper arrays.

According to a third aspect, the connection socket of the first or second aspect is provided, wherein each of the raised ridges extends over the gripper arrays and contacts the O-ring portion.

According to a fourth aspect, the connection socket of the first, second, or third aspect is provided, wherein each of the gripper arrays defines a plurality of rows of teeth.

According to a fifth aspect, the connection socket of the first, second, third, or fourth aspect is provided, wherein the plurality of gripper arrays ranges from 4 to 12 gripper arrays and the plurality of raised ridges ranges from 4 to 12 raised ridges.

According to a sixth aspect, the connection socket of the first, second, third, fourth, or fifth aspect is provided, wherein the metal alloy composition is selected from a group consisting of ferrous alloys, copper-based alloys and nickel-based alloys, and further wherein the tubular press connection is a press connection for piping configured to convey a gaseous medium.

According to a seventh aspect, a connection socket for a tubular press connection comprises a socket cup having a metal alloy composition. The socket cup comprises an O-ring portion defining an O-ring recess, and a plurality of gripper arrays positioned equidistant along an internal surface of the socket cup or a plurality of raised ridges positioned equidistant on an exterior surface of the socket cup.

According to an eighth aspect, the connection socket of the seventh aspect is provided, wherein the socket cup comprises the O-ring portion and the plurality of gripper arrays positioned equidistant along the internal surface of the socket cup.

According to a ninth aspect, the connection socket of the seventh aspect is provided, wherein the socket cup comprises the O-ring portion and the plurality of raised ridges positioned equidistant on the exterior surface of the socket cup.

According to a tenth aspect, the connection socket of the seventh, eighth, or ninth aspect is provided, wherein each of the raised ridges extends over the gripper arrays.

According to an eleventh aspect, the connection socket of the seventh, eighth, ninth, or tenth aspect is provided, wherein each of the raised ridges extends over the gripper arrays and contacts the O-ring portion.

According to a twelfth aspect, the connection socket of the seventh, eighth, ninth, tenth, or eleventh aspect is provided, wherein each of the gripper arrays defines a plurality of rows of teeth.

According to a thirteenth aspect, the connection socket of the seventh, eighth, ninth, tenth, eleventh, or twelfth aspect is provided, wherein the plurality of gripper arrays ranges from 4 to 12 gripper arrays.

According to a fourteenth aspect, the connection socket of the seventh, eighth, ninth, tenth, eleventh, twelfth, or thirteenth aspect is provided, wherein the plurality of raised ridges ranges from 4 to 12 raised ridges.

According to a fifteenth aspect, the connection socket of seventh, eighth, ninth, tenth, eleventh, twelfth, thirteenth, or fourteenth aspect is provided, wherein the metal alloy composition is selected from a group consisting of ferrous alloys, copper-based alloys and nickel-based alloys, and further wherein the tubular press connection is a press connection for piping configured to convey a gaseous medium.

According to a sixteenth aspect, a tubular press connection comprises a socket cup having a metal alloy composition. The socket cup comprises an O-ring portion defining an O-ring recess, a plurality of gripper arrays positioned equidistant along an internal surface of the socket cup, and a plurality of raised ridges positioned equidistant on an exterior surface of the socket cup. The tubular press connection further comprises an O-ring positioned in the O-ring recess and a tube having a metal alloy composition and comprising a pipe end in contact with the plurality of gripper arrays and the O-ring, the plurality of gripper arrays, O-ring and the pipe end defining a seal.

According to a seventeenth aspect, the press connection of the sixteenth aspect is provided, wherein each of the raised ridges extends over the gripper arrays.

According to an eighteenth aspect, the press connection of the sixteenth or seventeenth aspect is provided, wherein each of the raised ridges extends over the gripper arrays and contact the O-ring portion.

According to a nineteenth aspect, the press connection of the sixteenth, seventeenth, or eighteenth aspect is provided, wherein each of the gripper arrays defines a plurality of rows of teeth.

According to a twentieth aspect, the press connection of the sixteenth, seventeenth, eighteenth, or nineteenth aspect is provided, wherein the plurality of gripper arrays ranges from 4 to 12 gripper arrays and the plurality of raised ridges ranges from 4 to 12 raised ridges.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A connection socket for a tubular press connection, comprising:
 a socket cup having a metal alloy composition and comprising:
  an O-ring portion defining an O-ring recess;
  a plurality of gripper arrays equidistantly spaced around a circumference of an internal surface of the socket cup, wherein each of the plurality of gripper arrays extends axially between an open end of the socket cup and the O-ring portion and is oriented parallel to an adjacent gripper array; and
  a plurality of raised ridges equidistantly spaced around a circumference of an exterior surface of the socket cup, wherein the raised ridges are solid projections extending outward from the exterior surface such that a thickness of the socket cup is greater at the plurality of raised ridges.

2. The socket according to claim 1, wherein each of the raised ridges extends over a corresponding gripper array.

3. The socket according to claim 1, wherein each of the raised ridges extends over a corresponding gripper array and contacts the O-ring portion.

4. The socket according to claim 1, wherein the plurality of gripper arrays defines rows of teeth.

5. The socket according to claim 1, wherein the plurality of gripper arrays ranges from 4 to 12 gripper arrays and the plurality of raised ridges ranges from 4 to 12 raised ridges.

6. The socket according to claim 1, wherein the metal alloy composition is an alloy selected from the group consisting of a ferrous alloy, a copper-based alloy, and a nickel-based alloy, and further wherein the tubular press connection is a press connection for piping configured to convey a gaseous medium.

7. The socket according to claim 1, wherein each of the gripper arrays is spaced apart from the O-ring portion.

8. A connection socket for a tubular press connection, comprising:
 a socket cup having a metal alloy composition and comprising:
  an O-ring portion defining an O-ring recess; and a plurality of gripper arrays equidistantly spaced around a circumference of an internal surface of the socket cup, wherein each of the plurality of gripper arrays extends axially between an open end of the socket cup and the O-ring portion and is oriented parallel to an adjacent gripper array; or a plurality of raised ridges equidistantly spaced around a circumference of an exterior surface of the socket cup, wherein the raised ridges are solid projections extending outward from the exterior surface such that a thickness of the socket cup is greater at the plurality of raised ridges.

9. The socket according to claim 8, wherein each of the raised ridges extends over a corresponding gripper array.

10. The socket according to claim 8, wherein each of the raised ridges extends over a corresponding gripper array and contacts the O-ring portion.

11. The socket according to claim 8, wherein the plurality of gripper arrays defines rows of teeth.

12. The socket according to claim 8, wherein the plurality of gripper arrays ranges from 4 to 12 gripper arrays.

13. The socket according to claim 8, wherein the plurality of raised ridges ranges from 4 to 12 raised ridges.

14. The socket according to claim 8, wherein the metal alloy composition is an alloy selected from the group consisting of a ferrous alloy, a copper-based alloy, and a nickel-based alloy, and further wherein the tubular press connection is a press connection for piping configured to convey a gaseous medium.

15. The socket according to claim 8, wherein each of the gripper arrays is spaced apart from the O-ring portion.

16. A tubular press connection, comprising:
a socket cup having a metal alloy composition and comprising:
an O-ring portion defining an O-ring recess,
a plurality of gripper arrays equidistantly spaced around a circumference of an internal surface of the socket cup, and
a plurality of raised ridges equidistantly spaced around a circumference of an exterior surface of the socket cup, wherein the raised ridges are solid projections extending outward from the exterior surface of the socket cup;
an O-ring positioned in the O-ring recess; and
a tube having a metal alloy composition and comprising a pipe end in contact with the plurality of gripper arrays and the O-ring, the plurality of gripper arrays, O-ring and the pipe end defining a seal.

17. The press connection according to claim 16, wherein each of the raised ridges extends over a corresponding gripper array.

18. The press connection according to claim 16, wherein each of the raised ridges extends over a corresponding gripper array and contacts the O-ring portion.

19. The press connection according to claim 16, wherein the plurality of gripper arrays defines rows of teeth.

20. The press connection according to claim 16, wherein the plurality of gripper arrays ranges from 4 to 12 gripper arrays and the plurality of raised ridges ranges from 4 to 12 raised ridges.

* * * * *